US009284867B2

(12) United States Patent
Jainek (10) Patent No.: US 9,284,867 B2
(45) Date of Patent: Mar. 15, 2016

(54) OIL FILTER MODULE AND THERMOSTAT UNIT

(71) Applicant: MANN+HUMMEL GMBH, Ludwigsburg (DE)

(72) Inventor: Herbert Jainek, Heilbronn (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 324 days.

(21) Appl. No.: 13/769,789

(22) Filed: Feb. 18, 2013

(65) Prior Publication Data

US 2013/0153475 A1 Jun. 20, 2013

Related U.S. Application Data

(63) Continuation of application No. PCT/EP2011/064123, filed on Aug. 17, 2011.

(30) Foreign Application Priority Data

Aug. 18, 2010 (DE) .......................... 10 2010 034 788

(51) Int. Cl.
*B01D 35/147* (2006.01)
*B01D 35/18* (2006.01)
*B01D 35/30* (2006.01)
(Continued)

(52) U.S. Cl.
CPC ............. *F01M 11/03* (2013.01); *B01D 35/147* (2013.01); *B01D 35/18* (2013.01); *B01D 35/30* (2013.01); *F01M 5/007* (2013.01); *F01M 2011/033* (2013.01)

(58) Field of Classification Search
CPC ...... B01D 35/147; B01D 35/18; B01D 35/30; B01D 2201/16; B01D 2201/30; F01M 5/00; F01M 5/007; F01M 5/005; F01M 2011/033; F01M 11/03; F28F 27/00; F28F 27/02
USPC .......................... 210/130, 149, 184, 186, 232; 123/196 A, 196 AB; 165/103
See application file for complete search history.

(56) References Cited

U.S. PATENT DOCUMENTS 2,433,420 A * 12/1947 Booth ............................ 165/297
4,669,532 A * 6/1987 Tejima et al. ................. 165/297
(Continued)

FOREIGN PATENT DOCUMENTS

DE 102009041525 A1 3/2011

OTHER PUBLICATIONS

German patent office office action of DE 10 2010 034 788.4.
(Continued)

*Primary Examiner* — Joseph Drodge
(74) *Attorney, Agent, or Firm* — James Hasselbeck (57) ABSTRACT

An oil filter module (10) has a connection for a filter element (14) and an oil-coolant heat exchanger (12). Arranged in a housing (26, 42) is a bypass line (20) for bypassing the oil-coolant heat exchanger (12). The bypass line (20) has a valve chamber (22) with a thermostat unit (24). The thermostat unit (24) controls an oil flow through the bypass line (20) according to a temperature of the oil. The housing is made up at least of a valve housing part (26) and a heat exchanger housing part (42). The valve chamber (22) is arranged in the valve housing part (26). A base plate (40) of the heat exchanger housing part (42) closes the valve chamber (22) lengthwise.

8 Claims, 4 Drawing Sheets

(51) Int. Cl.
*F01M 5/00* (2006.01)
*F01M 11/03* (2006.01)

(56) References Cited

U.S. PATENT DOCUMENTS

| | | | |
|---|---|---|---|
| 5,520,801 A | 5/1996 | Gerber et al. | |
| 6,182,616 B1 | 2/2001 | Itoh et al. | |
| 6,994,784 B2* | 2/2006 | Jainek | 210/149 |
| 8,038,872 B2* | 10/2011 | Jokschas et al. | 210/86 |
| 8,057,687 B2* | 11/2011 | Jainek | 210/767 |
| 8,469,083 B2* | 6/2013 | Jainek et al. | 165/280 |
| 9,004,154 B2* | 4/2015 | Hagshenas et al. | 165/279 |
| 2005/0145706 A1* | 7/2005 | Cardinali Ieda | 236/93 R |
| 2007/0175434 A1 | 8/2007 | Gruner et al. | |
| 2010/0116465 A1* | 5/2010 | Jainek et al. | 165/103 |
| 2011/0045218 A1 | 2/2011 | Donaldson et al. | |

OTHER PUBLICATIONS

PCT-ISA-210 PCT search report of PCT/EP2011/064123.

* cited by examiner

OIL FILTER MODULE AND THERMOSTAT UNIT

CROSS REFERENCE TO RELATED APPLICATIONS

This application is Bypass Continuation of international patent application no. PCT/EP2011/064123, filed: Aug. 17, 2011 designating the United States of America, the entire disclosure of which is incorporated herein by reference. Priority is claimed based on German patent application no. DE 10 2010 034 788.4, filed: Aug. 18, 2010. The entire disclosure of German patent application no. DE 10 2010 034 788.4 is incorporated herein by reference in its entirety.

TECHNICAL FIELD

The invention concerns an oil filter module of a filter for oil, in particular motor oil or transmission oil, of an internal combustion engine especially of a motor vehicle, comprising a connector for a filter element, an oil-coolant heat exchanger for controlling the temperature of the oil, a housing in which a bypass line for bypassing the oil-coolant heat exchanger is arranged that comprises a valve chamber with a thermostat unit that, depending on the temperature of the oil, controls oil flow through the bypass line.

The invention further concerns a thermostat unit of an oil filter module.

PRIOR ART

Oil filter modules of internal combustion engines of motor vehicles that are known on the market have filter elements for filtering the motor oil. In a housing of the oil filter module an oil-water heat exchanger is integrated which, in extreme operating states, can be bypassed by means of a thermostat unit that is also integrated. The thermostat unit is located in a cylindrical cavity that is formed by core puller in the housing. The cavity has at a transverse side an insertion opening through which the thermostat unit is inserted. The insertion opening is closed by a closure screw. In this connection, a spring of the thermostat unit is pretensioned by means of the closure screw.

The invention has the object to configure an oil filter module and a heat exchanger bypass valve for an oil filter module in such a way that it can be produced in a simple way and is of a compact configuration.

SUMMARY OF THE INVENTION

This object is solved according to the invention in that the housing is comprised of at least one valve housing part and a heat exchanger housing part, the valve chamber is arranged in the valve housing part, and a base plate of the heat exchanger housing part closes off the valve chamber along a longitudinal side.

According to the invention, the valve chamber is thus already integrally formed upon molding of the valve housing part. The insertion opening is located within the connecting area, present anyway, of the valve housing part with the heat exchanger housing part. It is not necessary to form an additional opening that must be accessible from the exterior for insertion of the thermostat unit and must be closed after mounting of the thermostat unit. The housing as a whole is of a very compact configuration. Before assembly of the valve housing part and of the heat exchanger housing part, the valve chamber is open along the longitudinal side substantially across the length of the thermostat unit toward the connecting area of the valve housing part with the heat exchanger housing part so that the thermostat unit can be simply inserted transversely to the longitudinal axis of the thermostat unit. After assembly of the housing parts, the valve chamber is closed off seal-tightly by the base plate of the heat exchanger housing part.

In an advantageous embodiment, the valve chamber can have an approximately U-shaped profile. U-shaped in the meaning of the invention means that the transitions between the walls and a bottom side are rounded, in particular can be semi-circular or angled. U-shaped profiles can be realized simply by means of a casting process or injection molding process. Moreover, an appropriately shaped mounting plate of the thermostat unit can be inserted simply in the transverse direction into the valve chamber. Mounting plate separates the valve chamber seal-tightly into two chambers.

In a further advantageous embodiment, the thermostat unit can have a mounting plate and the valve chamber can have an approximately U-shaped receptacle that extends in transverse direction and into which the mounting plate of the thermostat unit can be inserted from the open side of the valve chamber seal-tightly, wherein the base plate of the heat exchanger housing part is resting seal-tightly on the facing side of the mounting plate. The U-shaped receptacle forms a guide for the thermostat unit that facilitates the installation and predetermines the end position of the thermostat unit. The mounting plate has inter alia the function of an adapter with which the thermostat unit can be matched to the valve chamber, in particular the receptacle. Moreover, the mounting plate serves as a guide for a control element and a filter element of the thermostat unit. Moreover, the mounting plate advantageously can have control edges that interact with corresponding control edges of the control element.

Advantageously, the mounting plate can have a control opening that is in particular circular and that can interact with a control element, wherein the control element is moveable coaxially relative to the control opening by means of a temperature-dependent expansion material, in particular a wax mixture, for controlling a degree of opening of the thermostat unit depending on the oil temperature. The mounting plate separates the valve chamber into two chambers. The oil can flow into one chamber and flow out of the other chamber. By means of the control opening, the two chambers can be connected with each other. By means of the control element, the control opening can be closed in a controlled fashion. With increasing oil temperature, the expansion material expands and moves the control element coaxially toward the control opening. In this way, a control gap between the control element and the control opening is made smaller. The oil flow through the bypass line is reduced. As a result of this, the oil flow through the oil-coolant heat exchanger is increased.

In a further advantageous embodiment, the control element can be cylindrical and a base surface can correspond to the base surface of the control opening so that the control element can be moved in the control opening in axial direction in a seal-tight way. The control element in this connection can be of a circular cylinder shape and the control opening can be circular wherein the diameters match each other. The round basic shapes enable an optimal adjustment of the control element with the control opening. Because of its cylindrical shape that matches the control opening, the control element can be immersed in a simple way and almost without any force expenditure seal-tightly and without canting into the control opening. This has the advantage that the thermostat unit cannot be damaged in case the oil reaches a temperature]

at which the expansion material expands so much that the control element would be pressed with increased force against the mounting plate.

Moreover, advantageously the control opening and the control element each can have on sides facing each other a circumferentially extending control edge that can be resting seal-tightly against each other for closing the thermostat unit. The two control edges define precisely the control gap. Upon movement of the control element toward the control opening, the control gap between the two control edges is gradually reduced so that a gentle closure of the thermostat unit is realized. In the position of the control element in which the circumferentially extending control edges are resting against each other, the thermostat unit is completely closed.

Advantageously, on the mounting plate a spring cage that surrounds the control opening may be arranged with a spring element, in particular a spiral pressure spring which is acting opposite to an expansion direction of the expansion material for returning the control element. When the oil temperature decreases after closing of the thermostat unit, the spring element assists opening of the thermostat unit in that it pushes the control element away from the control opening. The spring element is stably and safely arranged in a spring cage which is attached to the mounting plate. In this way, the thermostat unit can be premanufactured as a compact module and inserted into the valve chamber. Pretensioning of the spring element is realized in the pre-manufactured module simply by it being supported with one end on the spring cage and with the other end on the control element.

Advantageously, the axis of the control opening can be substantially extending in the longitudinal direction of the valve chamber. This has the advantage that the thermostat unit can be inserted in a simple way. The mounting plate can be inserted in this context simply in the transverse direction of the valve chamber, secured, and sealed.

In a further advantageous embodiment, the mounting plate and the receptacle can be of a semi-circular or angular shape. A semi-circular receptacle can be easily formed and in particular cast. The semi-circular configuration reduces the risk of canting upon insertion of the mounting plate and facilitates in this way the installation.

Moreover, the object is solved according to the invention with the heat exchanger valve in that the thermostat unit has a mounting plate that is designed such that it can be inserted seal-tightly from a side that is open in the longitudinal direction of a valve chamber of the oil filter module into a substantially U-shaped receptacle and a base plate of a heat exchanger of the oil filter module can be positioned seal-tightly onto the side of the mounting plate that is facing it. The features and advantages that are disclosed above in connection with the oil filter module according to the invention apply likewise to the thermostat unit according to the invention.

BRIEF DESCRIPTION OF THE DRAWINGS

Further advantages, features and details of the invention result from the following description in which embodiments of the invention will be explained in more detail with the aid of the drawing. A person of skill in the art will consider the features disclosed in combination in the drawing, the description, and the claims also expediently individually and combine them to further meaningful combinations. It is shown in:

In the Figures, the same components are provided with the same reference characters.

EMBODIMENT(S) OF THE INVENTION

Figure 1:
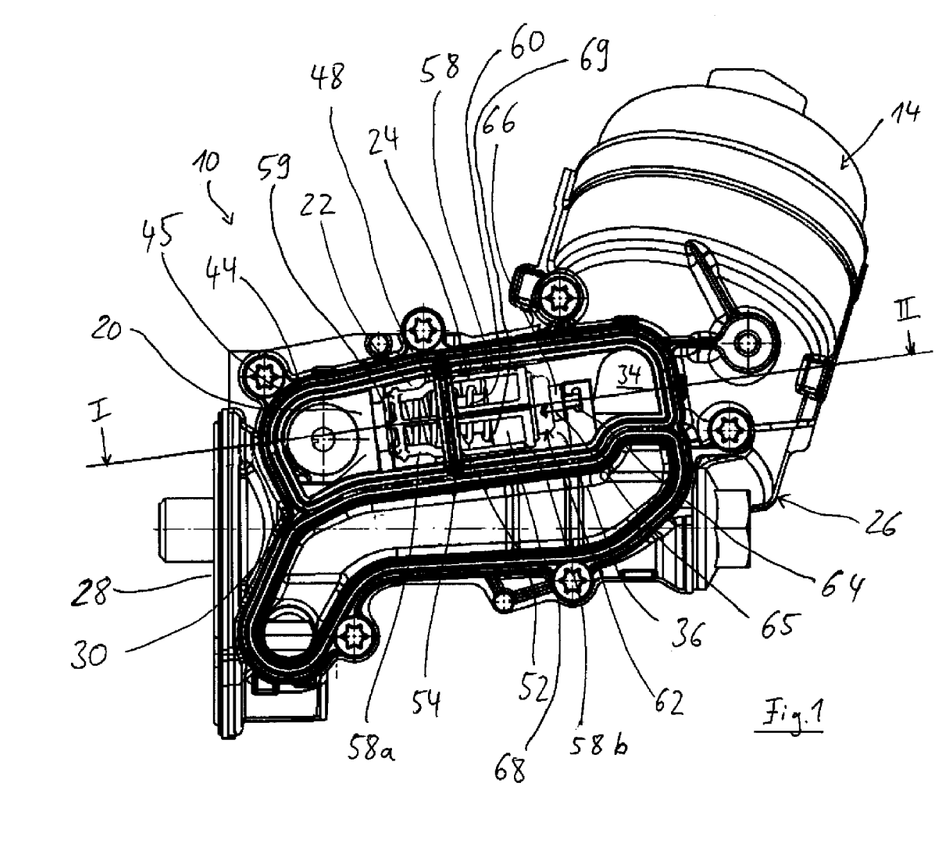
FIG. 1 schematically an open valve housing part of an oil filter module of an internal combustion engine of a motor vehicle in which a thermostat unit according to a first embodiment is arranged.
Figure 2:
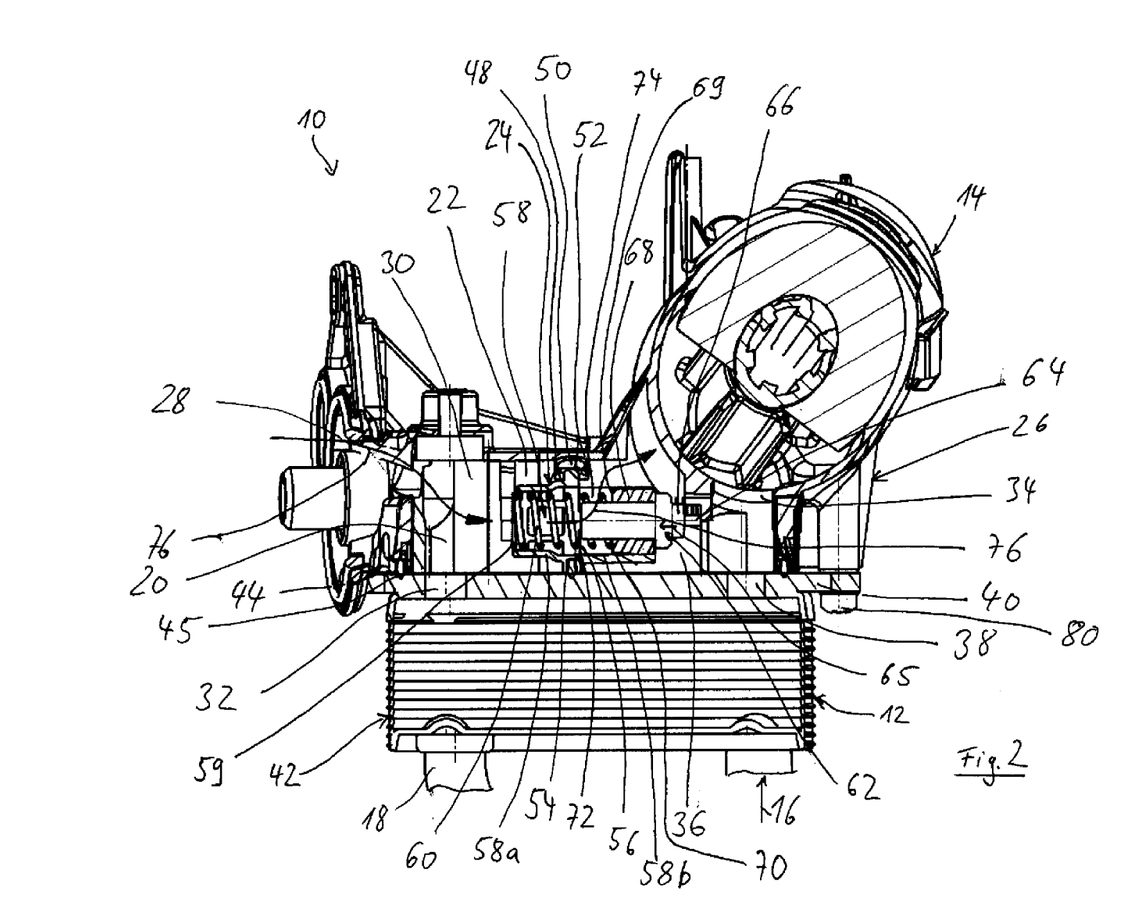
FIG. 2 schematically the mounted oil filter module with the valve housing part from FIG. 1 with open thermostat unit in a section along the section line II-II indicated therein.
Figure 3:
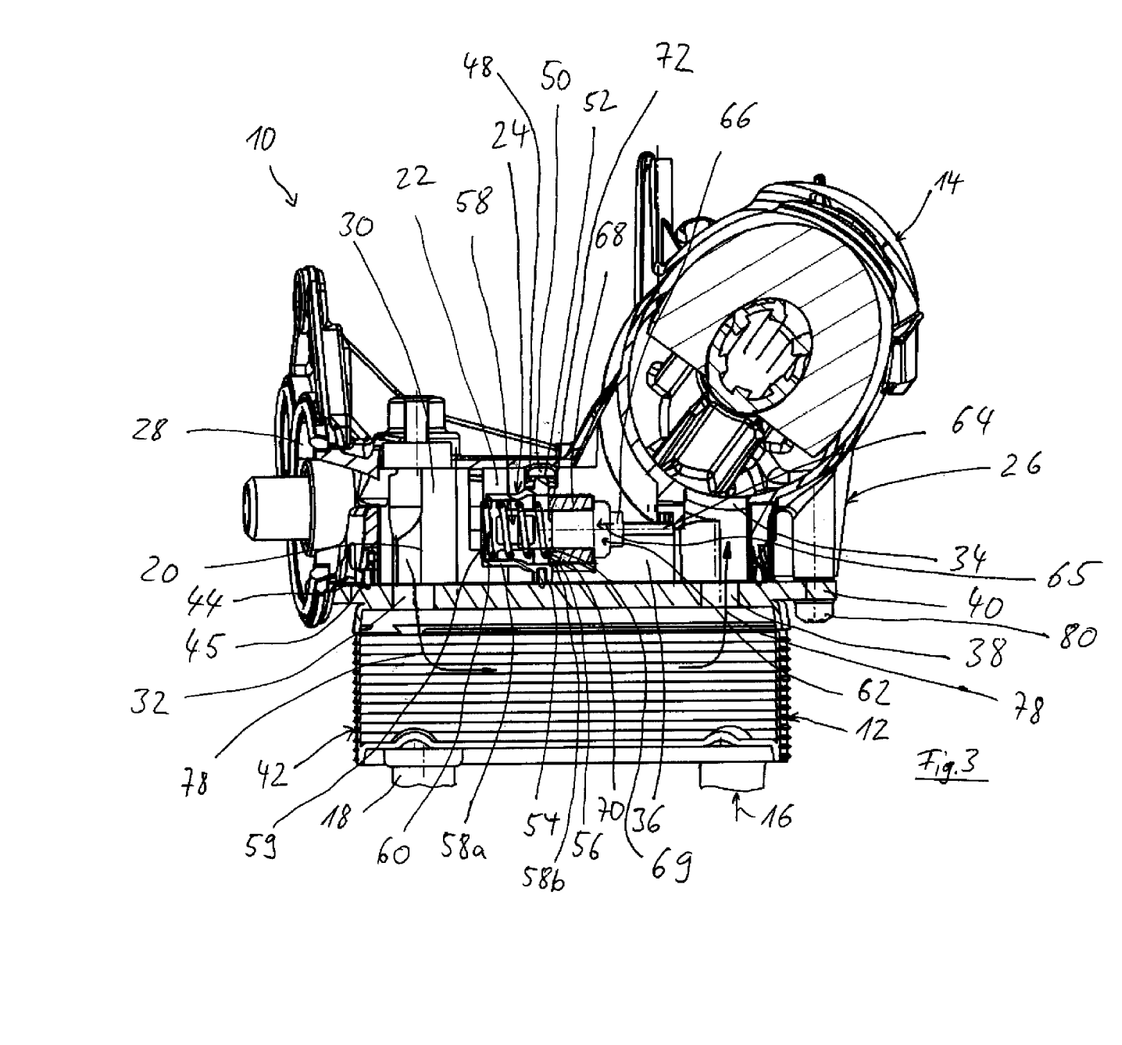
FIG. 3 schematically the oil filter module of FIG. 2 with closed thermostat unit.

In FIGS. 1 to 3 an oil filter module 10 for motor oil of an internal combustion engine of a motor vehicle is illustrated in which the motor oil to be filtered is guided from an oil circulation through on oil-coolant heat exchanger 12 into a filter 14.

On the oil filter module 10 there is provided a coolant inlet 16 for a coolant. The coolant, generally cooling water of a cooling water circulation of the internal combustion engine, is guided through the heat exchanger 12 to an outlet 18.

The oil filter module 10 has moreover a bypass line, as a whole identified by reference character 20, for bypassing the heat exchanger 12. In the bypass line 20 a valve chamber 22 with a thermostat unit 24 is arranged. The valve chamber 22 with the thermostat unit 24 is located in a valve housing part 26 of the oil filter module 10.

The filter 14 is a filter element which is screwed onto a filter connector. The filter connector is arranged as a monolithic part of the valve housing part 26.

The valve chamber 22 is a shaped part in the valve housing part 26 and has approximately a U-shaped configuration in profile. After manufacture of the valve housing part 26, the valve chamber 22 is initially open in longitudinal direction. An oil inlet 28 for the motor oil to be cleaned extends from a transverse side into an antechamber 30 of the valve chamber 22. A heat exchanger inlet 32 extends from the antechamber 32 to the heat exchanger 12. A bypass filter feed line 34 extends from a control chamber 36 of the valve chamber 22 to an inlet of the filter 14 at the raw side. A heat exchanger feed line 38 illustrated in FIGS. 2 and 3 connects an outlet of the heat exchanger 12 with the inlet of the filter 14 at the raw side.

The open longitudinal side of the valve chamber 22 in the finish-mounted oil filter module 10, as illustrated in FIGS. 2 and 3, is facing a base plate 40 of the heat exchanger housing part 42. The open longitudinal side of the valve chamber 22 is surrounded by a planar sealing rim 44. In the sealing rim 44 a sealing groove with a shaped seal 45, illustrated in FIG. 1, is provided. The shaped seal 45 seals relative to a sealing area of the base plate 40 that is also planar.

Between the antechamber 30 and the control chamber 36, an approximately U-shaped securing projection 48 is arranged in the valve chamber 22. The securing projection 48 extends on the inner wall of the valve chamber 22 in radial direction inwardly. On its radial inner side it has a receiving groove 50. The closed side of the securing projection 48, the that are positioned opposite the open longitudinal side of the valve chamber 22, and correspondingly the receiving groove 50 have a semi-circular extension.

Into the receiving groove 50 a mounting plate 52 of the thermostat unit 24 is inserted. The mounting plate 52 extends transversely to the valve chamber 22. On its side that is facing away from the open longitudinal side of the valve chamber 22, the mounting plate 52 is of a semi-circular shape in accordance with the receiving groove 50. On the open longitudinal side of the valve chamber 22 the edge of the mounting plate 52 is straight and is flush with the sealing rim 44. The edge of the mounting plate 52 has a sealing groove 50 thereat which at both sides is open relative to the sealing groove of the sealing rim 44. A monolithic section of the shaped seal 45 is positioned in the sealing groove 54.

The mounting plate 52 has centrally a circular control opening 56 which is illustrated in FIGS. 2 and 3. Cage sections 58a and 58b of a cage 58 are provided, respectively, on either side of the mounting plate 52 coaxial to the control opening 56 and surrounding it. They are monolithically arranged on the mounting plate 52. They are approximately hollow cylindrical and open at their end faces. On the end face that is facing the antechamber 30 the cage section 58a has a support rim 59, extending in radial direction inwardly, for a spiral pressure spring 60. The spiral pressure spring 60 is arranged coaxial to the control opening 56 in the cage 58. It is supported with one end on the support rim 59.

In the cage section 58b that is arranged in the control chamber 36 a control unit 62 is provided. The control unit 62 has a guide pin 64 that is arranged coaxial to the control opening 56 in the longitudinal direction of the valve chamber 22. The guide pin 64 is inserted with one end into an appropriate receptacle in the valve housing 26 against a stop. Between the spiral pressure spring 60 and the housing-associated end, a wax thermostatic element 66 in the form of a circular cylinder is arranged on the guide pin 64. Depending on the temperature of the motor oil that is contained in the valve chamber 22, the wax thermostatic element 66 expands axially to the guide pin 64 in an expansion direction 65.

On the guide pin 64 a control element 68 is guided in axial direction between the spiral pressure spring 60 and the wax thermostatic element 66. The control element 68 is a cup-shaped, circular-cylindrical sleeve. The control element 68 can be preferably made of metal, plastic material or ceramic. It is positioned with its bottom 69 on the base surface of the wax thermostatic element 66 that is facing the mounting plate 52 and is connected with the wax thermostatic element 66 by pressure application in a way that is not of interest in this context. The control element 68 can thus be moved with the wax thermostatic element 66 relative to the control opening 56 axially on the guide pin 64.

The outer diameter of the control element 68 corresponds to the inner diameter of the control opening 56. The open rim of the control element 68 forms in radial direction outwardly an element control edge 70. The element control edge 70 is facing the mounting plate 52 when the thermostat unit 24 is open (FIG. 2) and when the thermostatic unit 24 (FIG. 3) has just been closed. The radial inner edge of the mounting plate 52 that surrounds the control opening 56 forms a plate control edge 72 on the side that is facing the control chamber 36. The element control edge 70 and the plate control edge 72 are positioned seal-tightly against each other in the position illustrated in FIG. 3 of the thermostat unit 24.

The end of the spiral pressure spring 60 that is facing away from the support rim 59 is supported inwardly on the bottom 69 of the control element 68. The pretensioned spiral pressure spring 60 thus acts opposite to the expansion direction 65 of the wax thermostatic element 66.

When performing a cold start of the internal combustion engine, the temperature of the motor oil in the motor oil circulation is in general significantly below its operating temperature at which the motor oil is viscous. In the cold state, the wax thermostatic element 66, as illustrated in FIG. 2, has a minimal expansion. A control gap 74 between the element control edge 70 and the plate control edge 72 has its maximum size. The thermostat unit 24 is opened completely.

The cold motor oil passes, coming from the motor oil circulation, through the oil inlet 28 into the antechamber 30. It flows, indicated by the arrows 76, through the openings of the cage 58 into its interior. From there it flows through the control opening 56 and control gap 74 into the control chamber 36.

From the control chamber 36 the motor oil flows via the bypass filter feed line 34 into the inlet of the filter 14 at the raw side. It flows through the filter and is filtered in the filter 14. The purified motor oil exits in a way not of interest in this context from the clean oil outlet of the filter 14 and flows to the motor oil circulation.

As long as the thermostat unit 24, as shown in FIG. 2, is completely open, the motor oil supplied to the oil filter module 10 flows through the bypass line 20. The heat exchanger 12 is mostly bypassed. In this way, an unnecessary pressure loss as a result of oil passage through the heat exchanger 12 is avoided.

The motor oil that is flowing through the bypass line 20 is in direct contact with the wax thermostatic element 66 in the control room 36. With increasing oil temperature the motor oil heats the wax thermostatic element 66. The latter expands in the expansion direction 65. It presses against the pretension of the spiral spring 60 and moves in this way the control element 68 toward the mounting plate 52. The control gap 74 is decreased thereby so that the oil flow through the bypass line 20 is gradually reduced. The thermostat unit 24 is closed gently. Accordingly, oil flow increases, indicated in FIG. 3 by arrows 78, from the antechamber 30 through the heat exchanger inlet 32 into the heat exchanger 12.

Upon reaching an oil temperature that is adjusted by the wax mixture, the element control edge 70 is resting seal-tightly on the plate control edge 72 and the thermostat unit 24, as shown in FIG. 3, is completely closed. The entire incoming motor oil now flows through the heat exchanger 12.

In the heat exchanger 12 the motor oil is cooled in a way not of interest in this context. The cooled motor oil flows from the heat exchanger 12 through the heat exchanger filter feed line 38 to the inlet at the raw side of the filter 14. In the filter 14 the motor oil, as already mentioned above, is cleaned.

Even when the thermostatic unit 24 is completely closed, the motor oil still continues to flow via oil inlet 28 into the antechamber 30. The latter is connected by the control opening 56 with the interior of the control element 68. The incoming motor oil is thus in thermal contact with the wax thermostatic element 66 by means of the bottom 69 of the control element 68. Upon further temperature increase of the incoming motor oil beyond the adjusted temperature, the wax thermostatic element 66 continues to expand. It moves the control element 68 into the control opening 56. The control element 68 moves with sealing action in the control opening 56 axially to the guide pin 64 without the thermostat unit 24 being damaged thereby. In this way, the thermostat unit 24 survives even highest temperatures.

When the oil temperature decreases, for example, as a result of decreasing environmental temperature and/or of a decreasing load of the internal combustion engine, the expansion of the wax thermostatic element 66 is reduced. The pretension of the spiral pressure spring 60 assist in returning the control element 68 in the direction opposite to the expansion direction 65 so that the thermostat unit 24 will be gradually opened gently. A correspondingly increasing proportion of the motor oil flows through the bypass line 20 and bypasses in this way the heat exchanger 12. At maximum opening of the thermostat unit 24, illustrated in the FIGS. 1 and 2, almost all of the incoming motor oil flows again through the bypass line 20. Accordingly, the motor oil, even in case of changing operating conditions, is controlled as a whole always to optimal operating temperature in a simply way.

Likewise, when the internal combustion engine is turned off, during which time the motor oil will cool down, the thermostat unit 24 will gradually open so that, as described above, the bypass line 20 is open for bypassing the heat exchanger 12 during a future cold start.

When manufacturing the oil filter module 10, the valve housing 26 and the heat exchanger housing 42 are separately manufactured. In this connection, the valve chamber 22 is integrally formed as U-shaped pocket in the valve housing part 26. The thermostat unit 24 is separately premanufactured as a module.

The thermostat unit 24, with the semi-circular side of the mounting plate 52 leading, is inserted from the open side into the valve chamber 22 wherein the mounting plate 52 is guided in the receiving groove 50 of the securing projection 48. In its end position the mounting plate 52 is secured seal-tightly in the receiving groove 50.

The shaped seal 45 is inserted into the sealing groove of the sealing rim 44 and the sealing groove 54 of the mounting plate 52. Subsequently, the heat exchanger housing part 42 with the base plate 40 leading is placed onto the valve housing part 26. When doing so, the base plate 40 rests seal-tightly on the sealing rim 44 and the shaped seal 45 and closes off the valve chamber 22 in the longitudinal direction. The base plate 40 is screwed by means of screws 80 onto the valve housing part 26.

Figure 4:
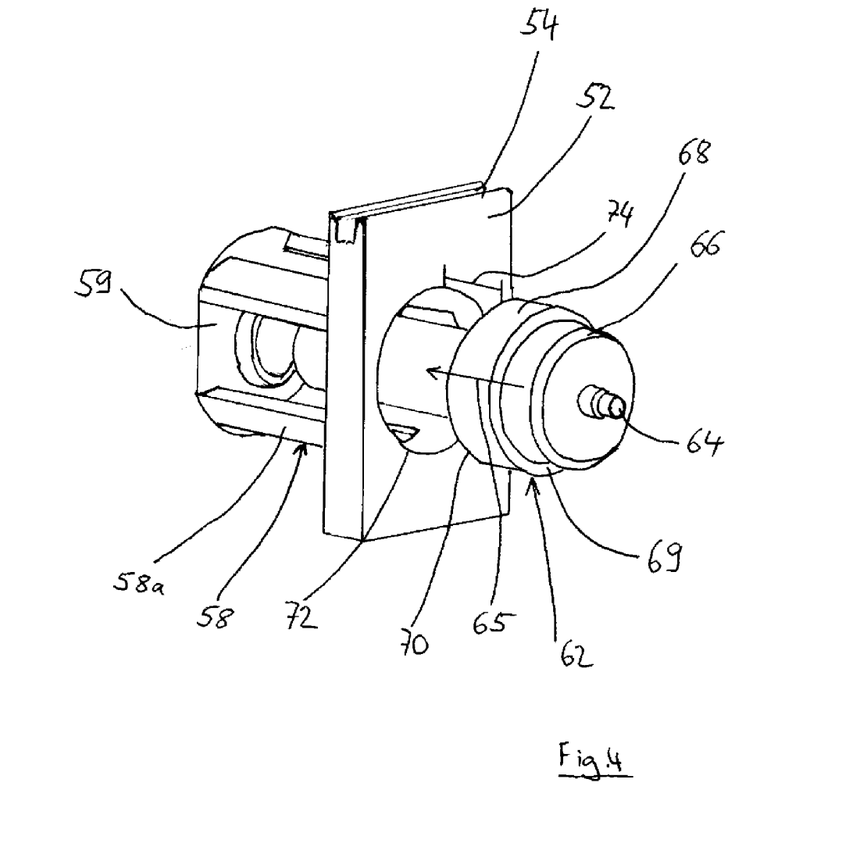
FIG. 4 schematically a second embodiment of a thermostat unit which is similar to the thermostat unit of the FIGS. 1 to 3 and is inserted into the oil filter module shown therein.

In FIG. 4, a second embodiment of a thermostat unit 24 is shown which is similar to the thermostat unit 24 according to the first embodiment described in the FIGS. 1 to 3. Those elements that are similar to those of the first embodiment are provided with the same reference characters so that with respect to their description reference is being had to the description of the first embodiment. In contrast to the thermostat unit 24 of the first embodiment, the mounting plate 52 is rectangular here. The cage section 58a in the antechamber 30 is configured somewhat differently than in the first embodiment. In order to avoid crowding of the drawing, in FIG. 4 the illustration of the spiral pressure spring 60 and of the cage section 58b in the control chamber 36 has been omitted.

In all of the above described embodiments of an oil filter module 10 and a thermostat unit 24 the following modifications are possible inter alia.

The invention is not limited to oil filter modules 10 for motor oil of internal combustion engines of motor vehicles. Instead, it can also be employed for other types of oils, for example, transmission oil. The invention can also be used in other types of internal combustion engines, for example, industrial motors.

Instead of the oil-coolant heat exchanger 12 also a different type of cooling device can be employed that, for example, is cooled by air, for example, headwind.

The control opening 56 and the control element 68, instead of having a round basic shape, can also have a different shape, for example, even an oval one or an angular one.

Instead of the wax thermostatic element 66 also a different kind of temperature-dependent expansion material can be employed.

Instead of the spiral pressure spring 60, also a different spring element can be employed. In case that the temperature-dependent expansion material has a restoring force that is sufficient for opening the thermostat unit 24 in case of temperature drop, the spiral pressure spring 60 can even be eliminated.

The invention claimed is:

1. An oil filter module of a filter for oil, comprising:
a connector for a filter element;
an oil-coolant heat exchanger controlling temperature of supplied oil;
a housing in which a bypass line for bypassing the oil-coolant heat exchanger is arranged, the housing including a valve chamber with a thermostat unit;
wherein the thermostat unit controls oil flow through the bypass line depending on the temperature of the oil;
wherein the housing is comprises
at least a valve housing part; and
a heat exchanger housing part;
wherein the valve chamber is arranged in the valve housing part, the valve chamber has a substantially U-shaped profile, an extension direction of legs of the U defining a longitudinal direction;
wherein the valve housing part includes a control chamber;
wherein a control unit is arranged within the control chamber, the control unit including a guide pin extending outwardly in the longitudinal direction away from the control unit in the control chamber;
wherein the guide pin is inserted into a guide pin receptacle in the valve housing and abutting against a stop;
wherein a base plate of the heat exchanger housing part closes off the valve chamber along a longitudinal side.

2. The oil filter module according to claim 1, wherein
the thermostat unit includes
a mounting plate and
the valve chamber includes
an approximately U-shaped receptacle that extends in transverse direction relative to the longitudinal direction, into which the mounting plate of the thermostat unit is inserted seal-tightly from the open side of the valve chamber,
wherein the base plate of the heat exchanger housing part is resting seal-tightly on the side of the mounting plate facing it,
wherein the mounting plate separates the valve chamber into two chambers.

3. The oil filter module according to claim 2, wherein
the mounting plate includes
a circular control opening that interacts with a control element,
wherein the control element by means of at least one temperature-dependent wax mixture, is coaxially moveable relative to the control opening for controlling the degree of opening of the thermostat unit as a function of the oil temperature.

4. The oil filter module according to claim 3, wherein
the control element is cylindrical and its base surface matches the base surface of the control opening so that the control element is movable seal-tightly in the control opening in axial direction.

5. The oil filter module according to claim 3, wherein
the control opening and the control element on sides that are facing each other are each provided with a circumferentially extending control edge resting seal-tightly on each other for closing the thermostat unit.

6. The oil filter module according to claim 3, wherein
on the mounting plate a spring cage surrounding the control opening is arranged with a spring element, in particular a spiral pressure spring, which is acting opposite to an expansion direction of the temperature-dependent wax mixture for restoring the control element.

7. The oil filter module according to claim 3, wherein the axis of the control opening extends substantially in the longitudinal direction of the valve chamber.

8. The oil filter module according to claim 2, wherein the mounting plate and the receptacle are semi-circular or angular.

* * * * *